US006012688A

United States Patent [19]

LaMotte

[11] Patent Number: 6,012,688

[45] **Date of Patent: *Jan. 11, 2000**

[54] COLLAPSIBLE DISPLAY SYSTEM

[76] Inventor: Lester A. LaMotte, 3002 Keating Ct., Burnsville, Minn. 55337-5616

[ * ] Notice: This patent is subject to a terminal disclaimer.

[21] Appl. No.: 08/878,745

[22] Filed: Jun. 19, 1997

Related U.S. Application Data

[63] Continuation-in-part of application No. 08/738,876, Oct. 28, 1996, Pat. No. 5,839,705.

[51] Int. Cl.$^{7}$ .................................................... F16M 11/24

[52] U.S. Cl. ...................... 248/165; 248/163.2; 248/164; 40/603

[58] Field of Search .................................... 248/165, 156, 248/163.2, 164, 175, 176.1, 431; 40/603, 604, 610, 749; 160/135, 368.1, 351; 211/189, 182

[56] References Cited

U.S. PATENT DOCUMENTS

| | | | |
|---|---|---|---|
| 4,017,152 | 4/1977 | Allen | 350/117 |
| 4,580,375 | 4/1986 | Nodskov et al. | 52/109 |
| 4,692,050 | 9/1987 | Kaufman | 403/3 |
| 4,694,601 | 9/1987 | Dicke et al. | 40/610 |
| 4,700,498 | 10/1987 | Perutz et al. | 40/603 |
| 4,800,663 | 1/1989 | Zeigler | 40/610 |
| 4,875,302 | 10/1989 | Noffsinger | 40/610 |
| 4,970,841 | 11/1990 | Zeigler | 52/646 |
| 5,123,550 | 6/1992 | Nodskov et al. | 211/189 |
| 5,203,126 | 4/1993 | Sorenson et al. | 52/109 |
| 5,230,196 | 7/1993 | Zeigler | 52/646 |
| 5,269,112 | 12/1993 | Weinrub et al. | 52/646 |
| 5,351,843 | 10/1994 | Wichman et al. | 211/195 |
| 5,362,020 | 11/1994 | Brown | 248/166 |
| 5,388,359 | 2/1995 | DeWitt | 40/606 |
| 5,444,946 | 8/1995 | Zeigler | 52/86 |
| 5,560,502 | 10/1996 | Hsiung | 211/95 |

*Primary Examiner*—Derek J. Berger
*Assistant Examiner*—Kimberly T. Wood
*Attorney, Agent, or Firm*—Nikolai, Mersereau & Dietz, P.A.

[57] ABSTRACT

The disclosure relates to any improved display system for holding display panels, photomurals, banners, signs or the like and in a generally upright, but angularly adjustable, position and particularly to a collapsible lightweight system that is easily assembled with the item to be displayed or collapsed for transport or storage. The display system can be used indoors as a stand alone support or outdoors with a stake-down system or stabilizing counter weights.

20 Claims, 15 Drawing Sheets

COLLAPSIBLE DISPLAY SYSTEM

This application is a continuation-in-part of application Ser. No. 08/738,876, filed Oct. 28, 1996 now U.S. Pat. No. 5,839,705.

BACKGROUND OF THE INVENTION

I. Field of the Invention

The present invention relates to improved display system for holding display panels, photomurals, banners, signs or the like in tension and in a generally upright, but angularly adjustable, position and particularly to a collapsible lightweight system that is easily assembled with the item to be displayed or collapsed for transport or storage. The display system can be used indoors as a stand alone support or outdoors with a stake-down system or stabilizing counter weights.

II. Related Art

There often exists a need to provide a temporary or portable device for displaying a photomural or other information carrying banner or sign that is readily deployed to support and display a relatively large sign and yet can be collapsed into a lightweight, easily carried compact form for transport and storage. Such a device would find advantageous use in retail sales displays, trade shows, fairs, lawn signs or the like to provide a variety of information to those in view of it. Certain types of signs have been devised that are portable and at least to some extent collapsible. One such device is disclosed by Dicke et al (U.S. Pat. No. 4,694,601) in which a sign panel is secured to a frame having four arms pivotally attached to a rigid central web. The four arms extend to form a cross bracing structure to hold the sign and are designed to fold down in one direction when collapsed.

Other folding signs are shown in Noffsinger (U.S. Pat. No. 4,875,302) and Brown (U.S. Pat. No. 5,362,020). Noffsinger discloses a portable, collapsible display sign in which hinged leg supports carry legs adjustable from a collapsed mode to a fully extended spread or open position by means of a slidable frame member. The sign is in the form of a stretchable elastic fabric secured to the frame and to each respective leg support such that tension in the fabric maintains the display in the open position in a two-sided system.

In Brown, pairs of pivotal legs are attached to a common cross member and adapted to swing in two directions between fully folded and fully deployed positions.

While these and other existing devices have certain attributes and provide a degree of flexibility and portability in successful display signs, there remains a need for a lightweight, durable, fully collapsible system that readily deploys from a knock-down transport or storage state to a fully expanded assembled display mode readily. There also exists a need for such a system in which many different banners or murals can be interchangeably displayed using the same frame or two-sided graphics reversed on the spot. In addition, an adjustable sign posture would provide an added desirable feature.

Accordingly, it is a primary object of the present invention to provide a versable, lightweight, durable, readily deployed, readily collapsible display support system for a banner or photomural display panel.

A further object of the invention is to provide a lightweight, durable, readily deployed, readily collapsible display support system for a banner or photomural display panel in which the banner or photomural can readily be reversed or exchanged relative to the support structure.

Another object of the present invention is to provide such a display support system in which the posture of the display panel is variable and easily adjusted.

Yet another object of the present invention is to provide such a display panel support system that is relatively rugged and economical.

A still further object of the invention is to provide a lightweight, durable, readily deployed, readily collapsible display support system for a plurality of banner or photomural display panels in which the banners or photomurals can be displayed in one or more direction.

A yet still further object of the invention is to provide a lightweight, durable, readily deployed, readily collapsible display support system for a plurality of banner or photomural display panels in which the banners or photomurals can be displayed a single direction consecutively in line.

Yet still another object of the invention is to provide such a display panel that readily adapts to tripod mounting for sue as a photo background, or the like.

Other objects and advantages associated with the display panel support system of the invention will become apparent to those skilled in the art upon further consideration of this specification, drawings and appended claims.

SUMMARY OP THE INVENTION

The present invention provides compact, lightweight, self-contained support systems that are easily deployed to carry and support one or more photomurals, banners, signs or the like under tension and that readily collapse to rather small sizes for transport and storage. As used herein, the terms “banner” or panel or photomural, etc. are defined to include all possible types of display articles susceptible of mounting using the support system of the invention.

The display support systems of the invention may take a variety of forms using relatively few interchangeable parts making them extremely versatile and easy to manufacture. The system may be constructed of segments of strong, light weight aluminum alloy tube connected using slip fittings and a few unique connecting hub devices. Other materials including other metals and polymeric materials or fiberglass may also be used for the rod segments. The support systems are made up of a plurality of hollow tube segments connected by one or more internal resilient cord systems that allow easy assembly and disassembly for transport or storage in a relatively small container. The support can be sized to carry one or more rectangular banners of any size or shape or a banner of any other configuration capable of being tensioned between such spaced parallel tubes. The system is very light weight and, for example, a single 4'×8' banner support of aluminum alloy may weigh less than a pound.

The preferred single banner embodiment incorporates a pair of spaced hollow mounting tubes which carry opposite edge loops of the banner threaded over the tubes. In an assembled system, the banner is carried on and between the mounting rods, spaced apart, the banner held in tension by a pair of hollow strut members crossed to form an X-bracing arrangement. The struts are made up from a plurality of slip-fit sections which combine to form elongated flexible tubular members which, when assembled in place, cross behind the banner and hold the mounting tubes in spaced parallel relation the flexible rods being somewhat longer than the transversal distance of the assembled structure and so assuming a bowed shape when connected to the mounting tubes. Both ends of each of the flexible struts of the X-bracing include terminal pins which are designed to be accommodated in openings in corresponding resiliently held hub members slip fitted into the ends of the spaced hollow mounting rod members. The openings in the hubs are elongated toward the surface to accommodate the struts over a range of angles between hub and strut. The X-bracing flexible strut members themselves are adjustably constrained at the intersection where they cross behind the banner by a central strap or loop member which allows relative displacement of the intersection along the X-bracing strut members.

Each hub end of one hollow mounting tube member, i.e., the one which carries the lower edge loop of the banner, and becomes the lower hollow mounting rod member in the combined structure, is also resiliently connected to one end of one of a pair of hollow base tube members, the other ends of which converge to intersect and form the legs of an isosceles triangle support base with the lower mounting tube member. The intersection of the base legs is connected by a hollow stabilizing tube member, of one or a plurality of slip fit sections, with the strap surrounding the intersection of the X-bracing strut members to complete and stabilize the mounting structure. Adjustment of the posture of the connecting rod relative to the base triangle correspondingly adjusts the posture of the banner.

The X-bracing tubular struts, particularly in larger models, are preferably made up of plurality of sequentially connected slip jointed tube segments tensioned by a resilient internal cord member of the type commonly referred to as "bungee" cords connected between end pins that are fit into the ends of each of the X-bracing struts as assembled. As stated, the converging base tube members and connecting strut member are also connected together utilizing a loop of resilient cord material which passes in a loop around the strap connecting the X-bracing intersection and extends through the stabilizing tube member segments as a pair of resilient cords, each of which is thereafter separately threaded through one of the base tube members to a terminal eyelet larger than the internal diameter of the base tube member and designed to be captured by the corresponding pin of the X-bracing strut tube when it is assembled in the hub opening in the corresponding hub in the lower mounting tube member.

In this manner, the system can easily be disassembled and assembled by applying tension to pull the connections apart at the hub or along the resilient connecting cords. As with the pins terminating the strut members of the X-bracing, the hubs at the ends of the upper and lower mounting rods may also be held in place by a common connecting resilient cord member attached to inside eyelets provided therein. The network of cords provides sufficient tension to stabilize the assembled unit and enough resistance to allow easy disassembly. The multiple segments of the X-bracing tubular struts readily fold when pulled apart and the connecting rod member segments readily fold with the base members. The banner or mural may be folded while still on the mounting rods or separately and the whole assembly readily stored in a carrying case or tube.

The triangular base, single banner display embodiments readily convert into a continuous-line multi-banner display by simply changing the hub members in the mounting rods from single ended, single port to double ended, double port hubs that accommodate two strut members. In this manner, as many consecutive banners or photomurals or the like as desired can be aligned and locked together, possibly as elements of a much larger picture or display. Each consecutive mural is supported on a triangular base so that the entire length is self-stabilized.

In another arrangement, the display system may be arranged using a parallelogram or rectangular construction with banners or panels in spaced back-to-back arrangements as two or four banner rectangular system. They may also form consecutively joined rectangular arrangements with back-to-back banners in which the individual systems join at the ends of the banner rods much in the manner of the triangular base systems. The rectangular configuration is stable in an upright position or on its side as a table or table-topped display. Combinations of all types may be constructed to form bridges or other configurations.

The stability of the X-brace configuration further allows mounting as by clamping the X intersection over itself to a mounting pedestal for a variety of uses. One such use is a tripod mount that allows adjustment of a mural to be used as a photo background, reflective screen or the like.

BRIEF DESCRIPTION OF THE DRAWINGS

In the drawings wherein like numerals characteristically identify like parts throughout the same.

DETAILED DESCRIPTION

Figure 1:
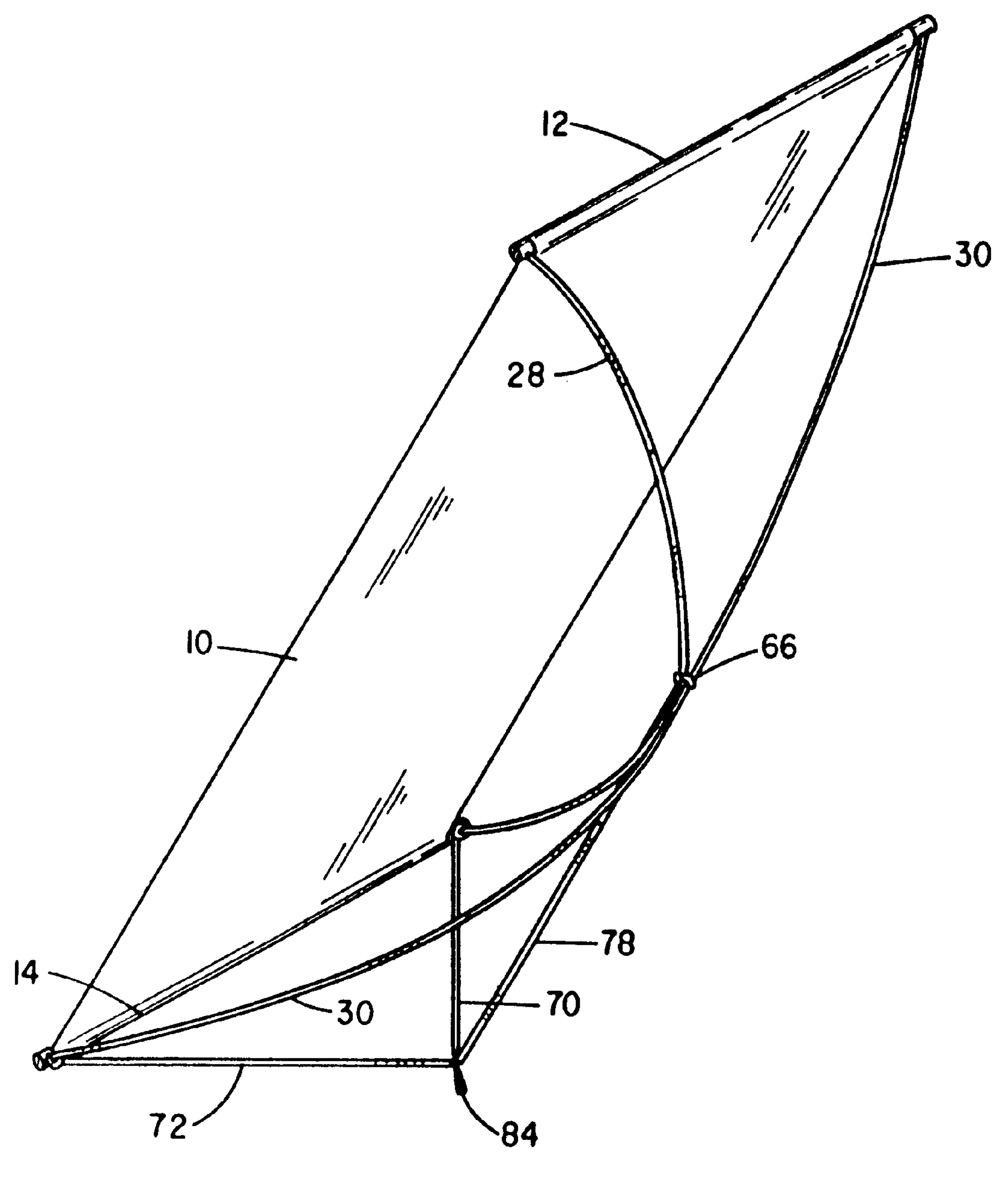
FIG. 1 is a perspective view of an assembled display system in accordance with the invention.

It will be appreciated that the present invention provides a compact, light weight, self-contained support system that comes apart quite easily for storage and transport and that readily assembles without tools into a resilient versatile banner display system with many configurations and applications. This system represents an excellent mode for displaying a banner, photomural, sign or other flexible information conveying display device capable of being carried between spaced mounting rods in an adjustably, generally vertical setup. The embodiments shown in the drawings illustrate the concept of the system but are not intended to be limiting in any way with respect to other, similar versions which might occur to those skilled in the art. The system can be utilized indoors or outdoors and several devices for holding the displaced end in place are also illustrated below.

Figure 2:
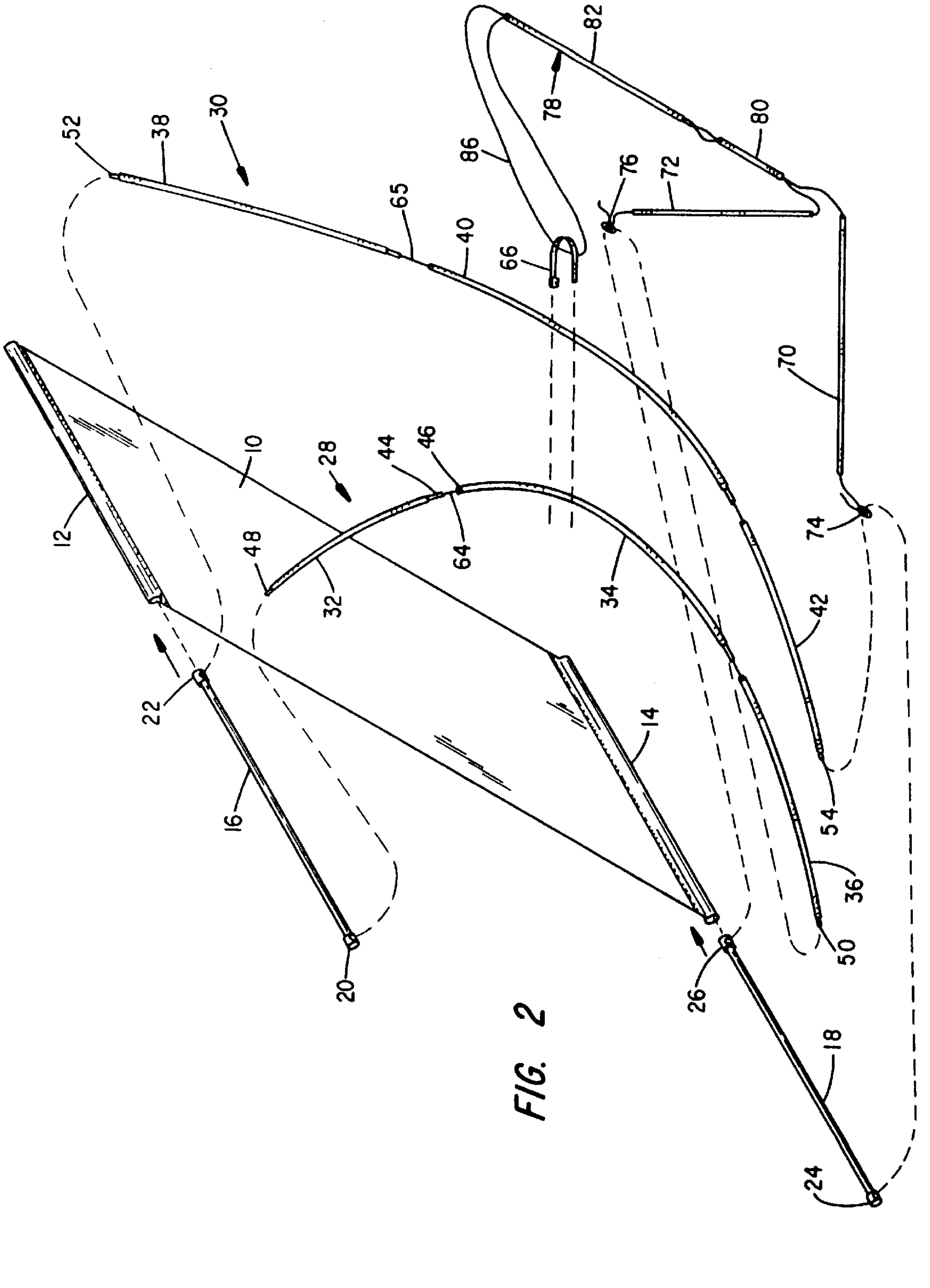
FIG. 2 is a generally blown apart view of the display system of FIG. 1.
Figure 3:
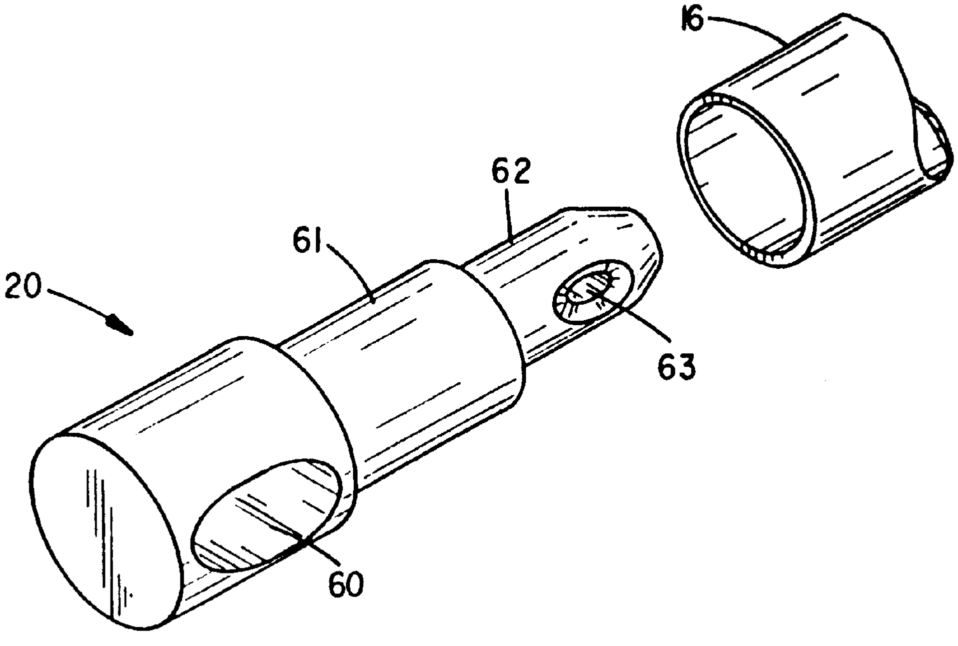
FIG. 3 is an enlarged perspective view showing a typical mounting tube end and mounting tube hub member.
Figure 4:
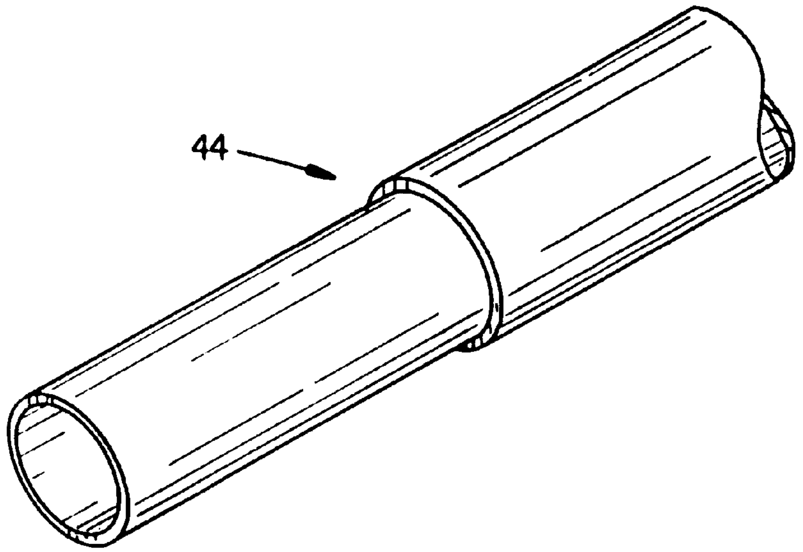
FIG. 4 is an enlarged view of a typical slip fit end utilized in the segmented tube assembly of the system.

FIGS. 1–3 show the general concept in assembly of the banner display system of the invention in which a banner, generally at 10, and having at its ends mounting loop segments 12 and 14. The loop segments 12 and 14 are designed to slip over respective hollow mounting tubes 16 and 18. The hollow mounting tube 16 is provided with end hubs 20 and 22 and, likewise, rod 18 is provided with the mounting hubs 24 and 26. The mounting tubes are held spaced apart by a pair of elongate segmented flexible hollow strut members 28 and 30 with strut member 28 being made up of individual segments 32, 34 and 36 and strut member 30 being assembled from segments 38, 40 and 42. The strut members 28 and 32 are assembled using slip joint members as at 44 which fit the inside diameter of the adjacent hollow strut section as at 46 (FIG. 2). The hollow flexible strut members 28 and 30 are further provided with terminal pins 48, 50, 52 and 54, respectively. The terminal pins are designed to be accommodated in corresponded angled openings in the hub members of the hollow mounting tubes such as 20 which is featured in the enlarged perspective view of FIG. 3.

Hub 20 and the other hubs described herein are typically machined from an aluminum alloy such as 211T3 aluminum. Hub 20 is provided with a necked-down (shank) section 61 designed to fit into the hollow mounting tube 16. The remaining portion of the hub protrudes out of the tube and is provided with a recess 60 designed to accommodate the pin 48 as illustrated in the blown apart view of FIG. 2. The opening of the recess 60 is laterally wider than the diameter of the terminal pins so that the terminal pin may be accommodated despite variations in the addressing angle along in the direction of the elongation with respect to the hub member 20. The hubs 20, 22, and 24, 26, are, in turn, held in the ends of the respective upper and lower mounting tubes 16 and 18 by cords connected through inner openings in section of further reduced diameter 62 the hub such as illustrated in at 63 countersunk at 64 to prevent cord damage.

The segmented flexible hollow strut members 28 and 30 are respectively held together by internal resilient cord members 64 and 65 which are connected between the terminal pins as at 48 and 50 in the case of strut 28. The terminal pins 48 and 50 contain cord connection openings (not shown), but which are similar to opening 61 in the hub member 20 for attachment of the resilient cord.

The composite flexible hollow struts or braces 28 and 30 cross behind the banner 10 to cross brace the structure when each of the ends is inserted in the respective proper opening in the hub as at 60 in hub 20 illustrated in FIG. 3. The crossing position is provided with a retaining strap member as at 66 (as shown in FIGS. 1 and 2) and, as also evident from the figures, the flexible hollow struts become somewhat bowed as they support the banner 10 in tension forcing the upper and lower mounting tubes 16 and 18 apart.

The system is further provided with an integral connected triangular-shaped stable support base that includes a pair of hollow tube base members of equal length 70 and 72 which form an isosceles triangle with the lower hollow mounting rod 18 connected by respective eyelets 74 and 76 which are designed to accommodate terminal pins 54 and 50, respectively, prior to those terminal pins being inserted in the respective hubs 20 and 26 of the lower mounting tube member 18. In this manner, one end each of the members 70 and 72 are attached to the lower hollow mounting tube 18. The remaining ends converge and are further connected with a segmented stabilizing tube member 78 having segmented portions 80 and 82 and which connects between the strap 66 and the converging free ends of the members 70 and 72 at 84 assuming thereby a generally vertical posture. As can best be seen in FIG. 2, the entire supporting structure including members 70, 72 and 78, together with eyelets 74 and 76, are interconnected and also connected to the strap 66 via a continuous common resilient cord loop as at 86.

Figure 5:
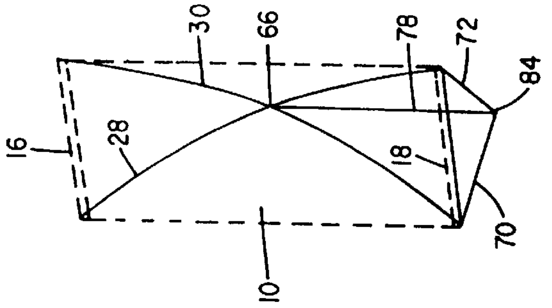
FIG. 5 is a schematic perspective view from behind an assembled display system in accordance with the invention.
Figure 6:
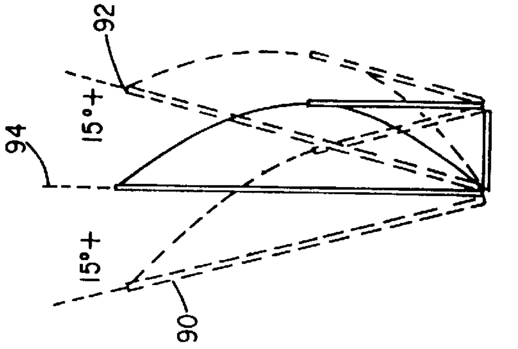
FIG. 6 is a schematic view showing the adjustability of the banner display system of FIG. 5.

Once assembled, the banner support system can be moved about and picked up by grasping the back in the vicinity of the strap 66 as it remains quite stable. As shown in FIG. 5, assembled member 78 becomes a vertical stabilizer between the intersection of the flexible struts 28 and 30 and the corner of the triangular base at 84. This provides a structure which geometrically includes at the same time many triangles which create a very stable structure. FIG. 6 depicts that the posture of the whole structure can be tilted forward and backward simply by changing the angle between the member 78 and the vertical pull that whole structure back or push it forward and it will remain stable in the extreme positions or in any position therebetween because of the elastic nature of the assembly. FIG. 6, though not limiting, illustrates a 30° range which includes tilting the banner forward 15° at 90 and back 15° at 92. The vertical position being shown at 94. The elastic nature of the assembly utilizing a plurality of resilient cord members results in a structure which is stable and supportive, yet can be shifted or distorted and one which will remain in the shifted position.

Figure 7:
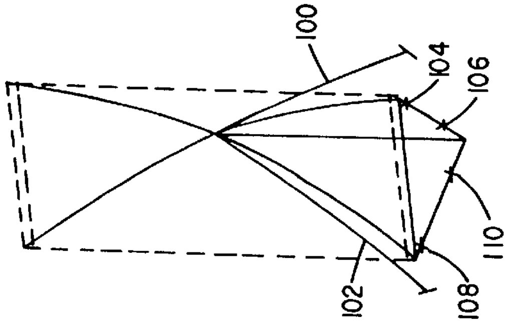
FIG. 7 is a rear schematic perspective view showing a tie-down system in conjunction with the display system of the invention.

FIG. 7 shows the same structure in a staked or outdoor application. Whereas the normal application is indoors where the banner system is not subjected to wind or other disturbances which may cause it to blow down, it can be readily staked outdoors as by cords 100 and 102 as shown in FIG. 7. In addition, the members of the base triangle may also be staked to the ground as shown at 104, 106, 108 and 110.

Figure 9A:
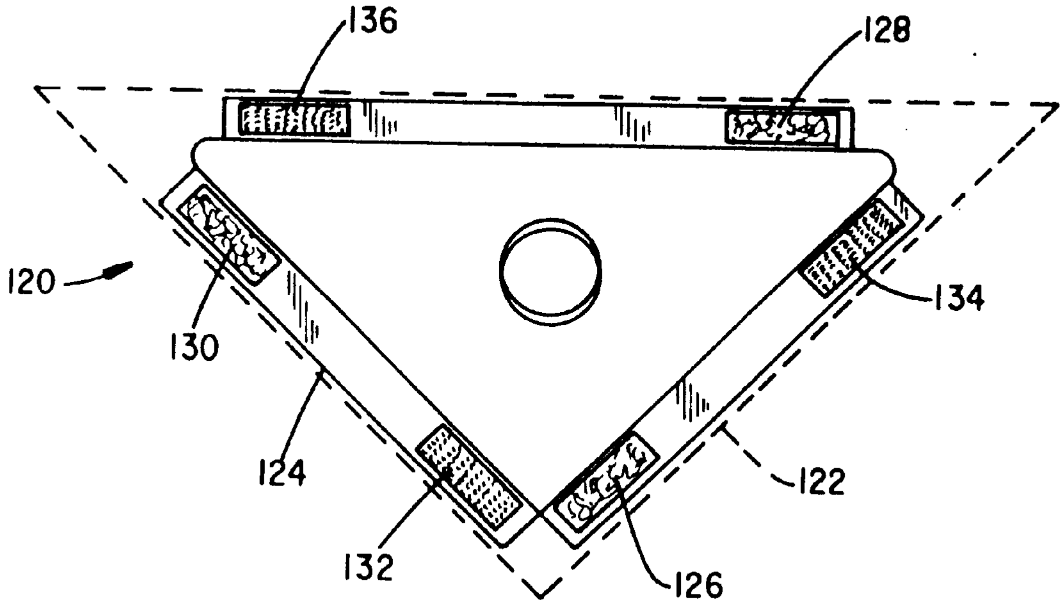
FIG. 9A is a plan view of a right triangle shaped water bladder hold-down device for stabilizing the stand base of the invention.
Figure 9B:
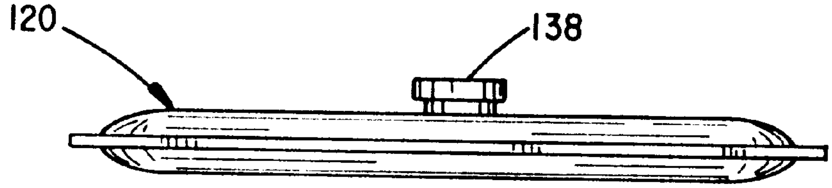
FIG. 9B is a side elevational view of the water bladder of FIG. 9A.

Another outdoor or indoor stabilization system is shown on FIGS. 9A–12, triangular sand bags, water bladders or other such shapes, or the like, can be connected to hold down one or more of the lower base members to retain the system in place, if desired. FIG. 9A depicts a plan view of a water bladder generally at 120. A triangular outline depicting the full equivalent right triangle at 122 and a solid line depicting the actual shape at 124. A hook and loop attaching system may be utilized with the water bladders and hook patches are represented as at 126, 128 and 130 with loop patches illustrated at 132, 134 and 136, respectively. The side elevational view of FIG. 9 illustrates a similar bladder with a filler cap at 138 for the addition of water as the weighting material.

Figure 10:
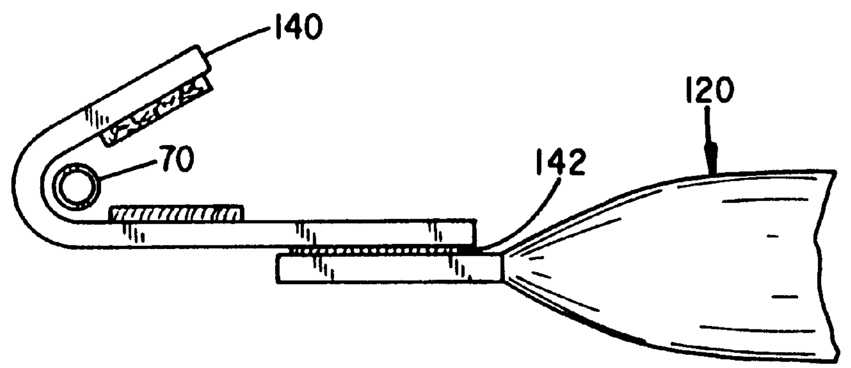
FIG. 10 is a plan view detail showing connection of a water bladder in accordance with FIG. 9A over a base tube member of the stand base of the invention.

FIG. 10 illustrates use of a hook and loop connecting system in which a hold-down connecting member 140 is looped about a base tube member as at 70 and also connected by a second hook and loop connection at 142 to a bladder as at 120.

Figure 11:
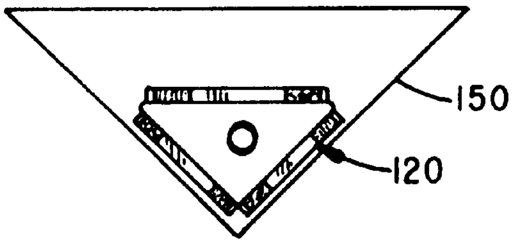
FIGS. 11 and 12 depict various patterns of water bladders usable with various sized displaced ends in accordance with the invention.
Figure 12:
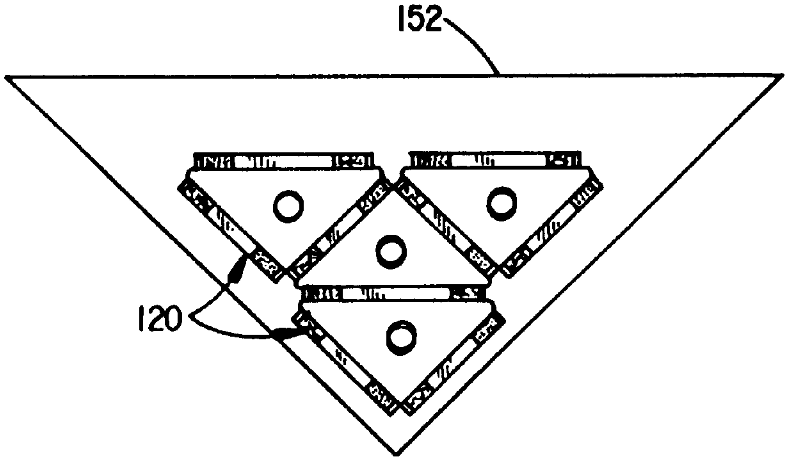

FIGS. 11 and 12 further illustrate the placement of single and multiple water bladders relative to smaller and larger triangular bases at 150 and 152. In this manner, a variety of such weighted water bladders can be combined to hold down large or small triangular bases in any configuration and simply hook together utilizing hook and loop connecting systems thereby providing the necessary additional weight to stabilize the base without interfering with the display.

Figure 8A:
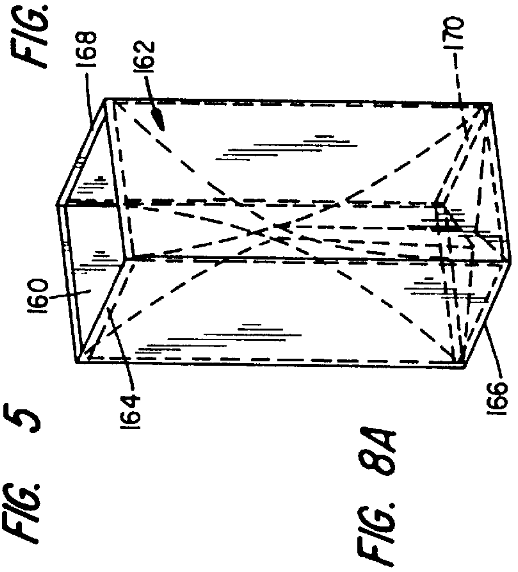
FIGS. 8A and 8B are schematic views showing connected back-to-back banner systems used in a more complex display.
Figure 8B:
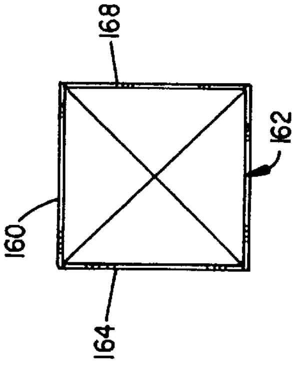

FIGS. 8 and 8A depict the placements of the banner support or display stand systems of the invention back to back to display banners in opposite directions somewhat like the concept of the tradition sandwich board. Thus, two system 160 and 162 mounted back to back can further be connected by top and bottom members as at 164, 166, 168 and 170 to form a composite box structure for added stability. It will further be appreciated that such a box structure can accommodate 4 individual units at 90° to produce a 4-banner, 4-sided display.

To assemble the banner display support system of the invention, the terminal pins of the flexible X-bracing struts 28 and 30 can readily be pulled out of the hubs on the upper and lower mounting rods and thereafter the system simply can be collapsed into its elemental states by tensioning the cords in the members 28, 30, 78 thereby reducing them to their segmental size. These, along with the two banner mounting tubes, possibly with the banner still attached or with the banner removed and rolled up, can easily be stowed within a rather small container such as a rounded canister for storage and transport. The system, thus, is a knock-down or collapsible, readily assembled banner stand which has flexibility and versatility realizing that the banner can be displayed at any of many angles forward and back of the vertical and can be staked or otherwise held for outdoor applications. The system simple of construction requiring only elastic cord elements and segmentally slip jointed tubing with terminal pins, together with a pair of banner mounting tubes having resiliently connected end hubs designed to adjustably accommodate the terminal pins. It will be appreciated that any flexible fabric can be used for the banner including flag nylon, velvet loop, wall carpet, vinyl, other polymers and even some papers. Graphics can be one or two sided and the banner may be reversible. Many patterns can be described using multiple units and, of course, any number of banners can be interchanged using the same structure. It will further be appreciated that the structure can be made any desirable size and utilize fewer or more interconnected segments at the discretion of those skilled in the art and remain within the confines of the scope of the invention.

Figure 13C:
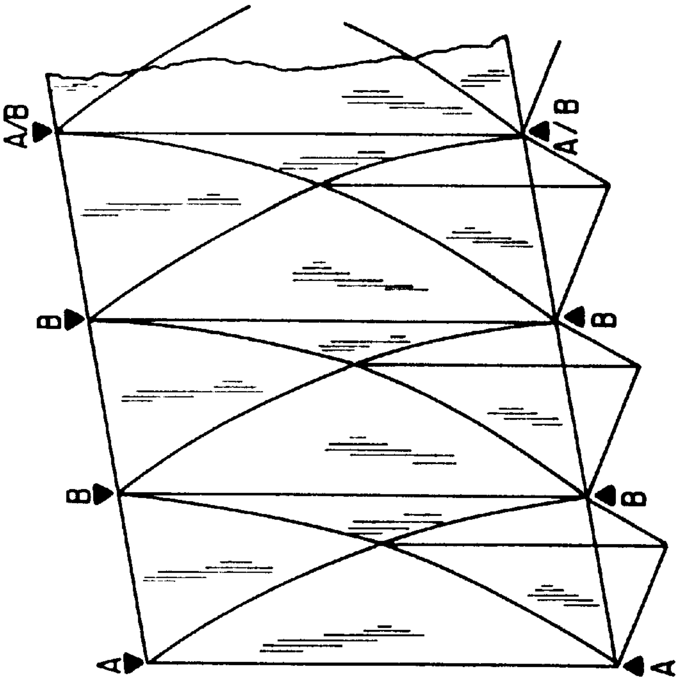
FIGS. 13A and 13C depict in-line combinations of the embodiment of FIGS. 1–7.
Figure 13B:
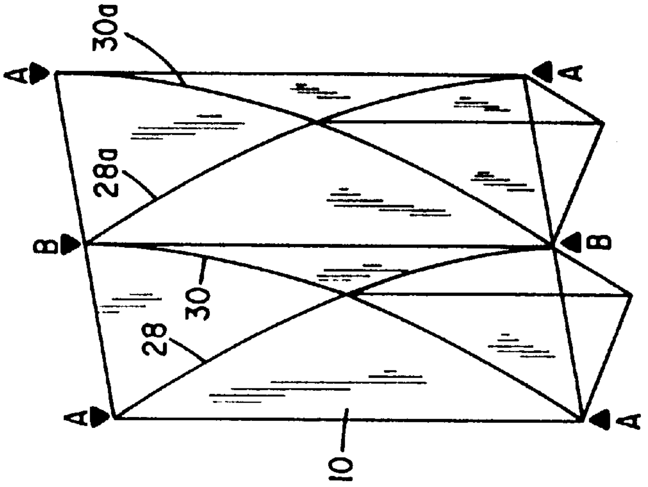
Figure 13A:
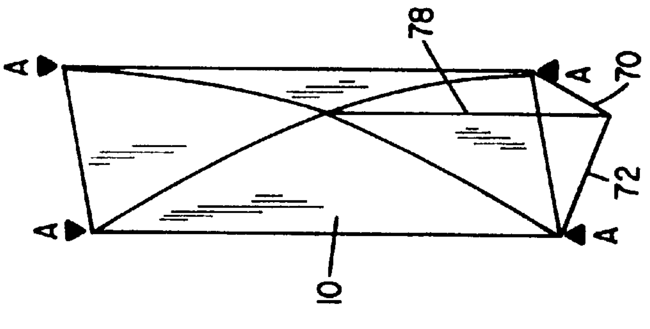

An important aspect of the invention is the relative simplicity of the concept of the self-contained support system of the invention together with the adaptable versatility that enables the system to expand and be easily modified to accommodate a proliferation of useful forms. FIGS. 13A–13C depict the formation of a linear combination of the triangular base embodiment of FIGS. 1–7 in which any number of banners 10 may be consecutively mounted and aligned to produce a larger photomural or banner or to display different images consecutively. Add-on or consecutive assembly can be achieved by simply replacing the single ended, single bore type hubs, such as shown at A in FIGS. 14A and 14B, with double ended, dual bore hubs, as shown at B in FIGS. 15A and 15B, where banners are to be joined. In this manner, the hub will accommodate successive cross brace or strut members as at 30 and 28A in FIG. 13B. FIG. 13C depicts the attachment of additional units with the last hub being depicted as A or B depicting the option of adding additional units to the display or terminating it at that point.

Figure 14A:
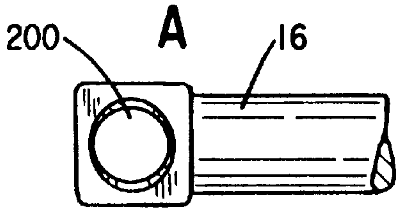
FIGS. 14A and 14B depict details of one single bore connecting hub (A hub) for use in assembling the support systems of the invention.
Figure 14B:
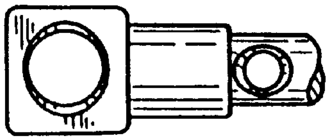
Figure 15A:
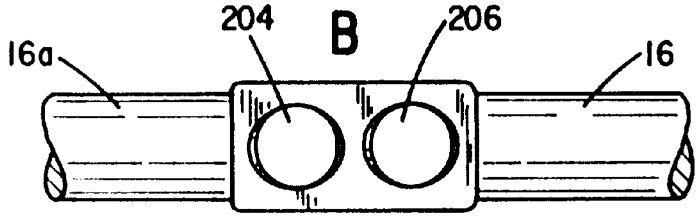
FIGS. 15A and 15B depict a dual bore connecting hub with the invention.
Figure 15B:
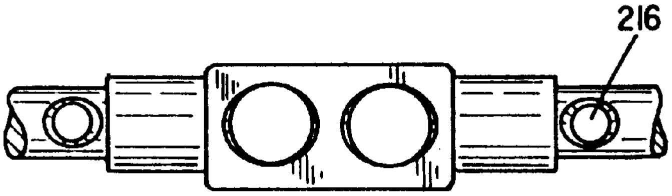

The bore 200 of the A hub of FIG. 14A is shown inserted into an end fragment of a tubular member 16 and without the tubular member in FIG. 14B with bungee cord eyelet 202. These eyelets are as previously described in accordance with other embodiments. Likewise, the double ended, dual bore version B is shown inserted into fragmentary tube 16*a* and 16*b* in FIG. 15A and bungee bores 208 and 210 are shown in FIG. 15B without the tube 16*a* and 16*b*.

Figure 16A:
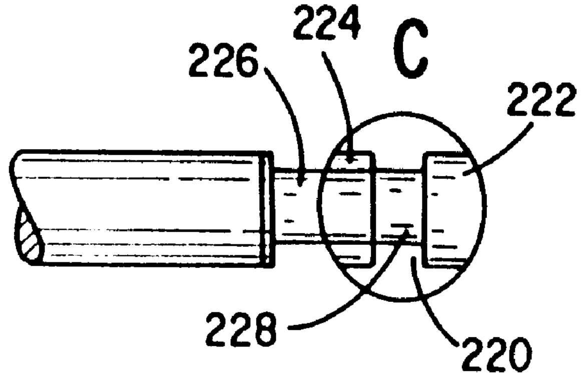
FIGS. 16A and 16B depict one hub locking system associated with a hub configuration of the invention.
Figure 16B:
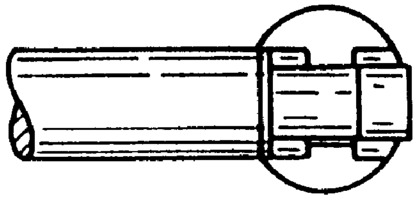
Figure 22A:
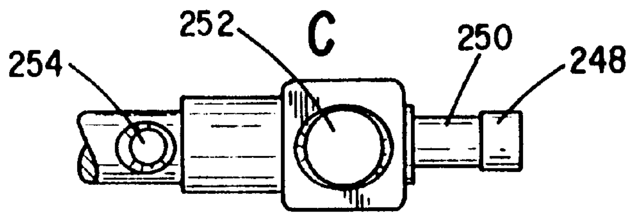
FIGS. 22A and 22B illustrate one hub used in the construction of the rectangular banner display support system.
Figure 22B:
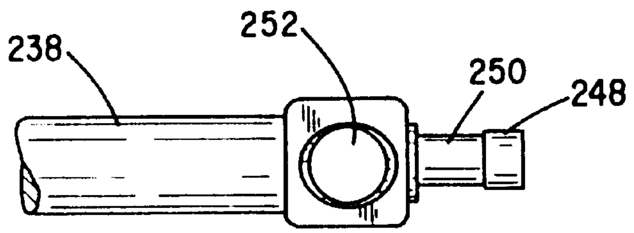

FIGS. 16A and 16B illustrate an alternative self-latching or self-locking hub arrangement which may be utilized with any of the hubs illustrated. In this arrangement, each hub A, B or C (FIGS. 22A and 22B) is provided with a bore 200 having a central opening 220 that is smaller than the adjacent recesses 222 and 224 of larger bore on either side thereof thereby forming a narrowed or necked-down passage. Each corresponding strut terminal pin or other terminal pin on the hubs has a corresponding end knob as at 228 of a diameter slightly larger than the remainder or shank of the pin. The knob 228 is just able to slip through the central opening 220 in the bore 200 as shown in FIG. 16A. In FIG. 16B, the end knob 228 is beyond the central opening 220 and so is due to resume an angled posture in accordance with the bowing of the strut the knob 228 thereby preventing withdrawal of the pin 226 and locking the strut in position. The rectangular systems also lock in a similar manner as will be described below.

Figure 17B:
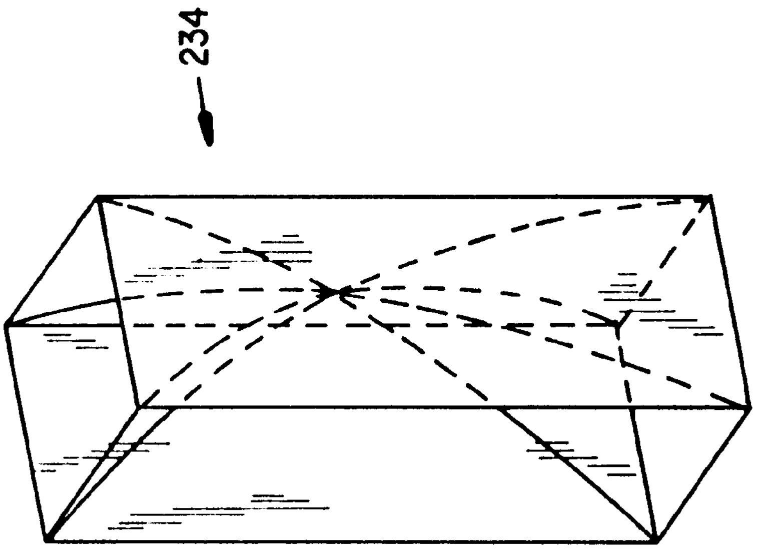
FIGS. 17A and 17B depict two assembled rectangular banner display support systems.
Figure 17A:
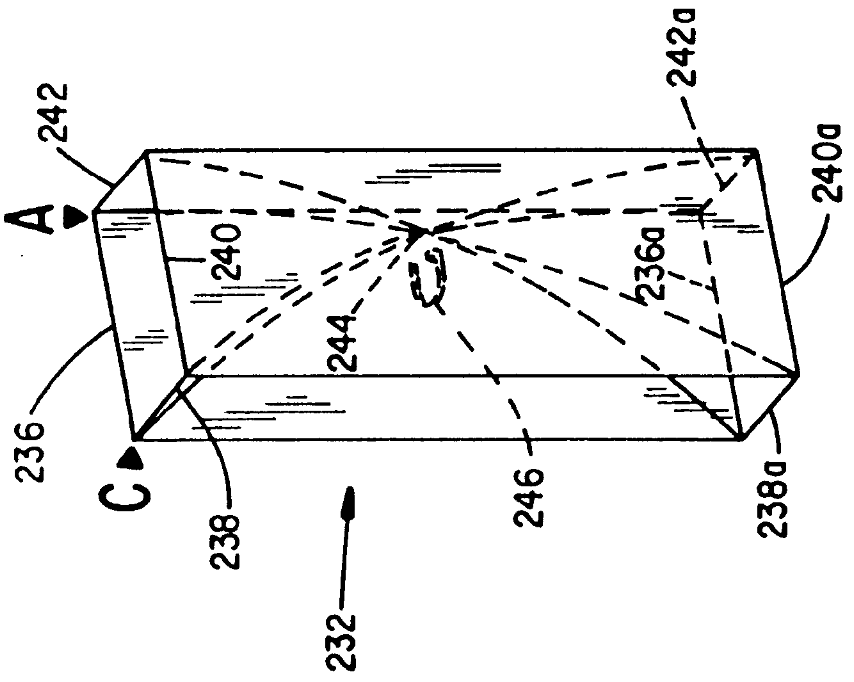

FIGS. 17A and 17B illustrate different rectangular or tower banner display arrangements, generally at 232 and 234, respectively, suitable for mounting two, three or four banners about the size of the assembly. In this arrangement, four upper tube members as at 236, 238, 240 and 242 and four corresponding lower tube members as at 236*a*, 238*a*, 240*a* and 242*a* are provided. Back-to-back X-bracing strut configurations similar to those previously described in conjunction with the triangular system are provided which converge centrally as at 244 and are retained as by a strap member 246. Detail of these need not be repeated. Two X-braced strut configurations suffice to create a sufficient and stable tension balance in the structure to support and expand 2–4 banners.

As indicated by the letters in FIG. 17A, the opposite and parallel cross tube members 238 and 242 carry terminal hubs of a type C (FIGS. 22A and 22B) which include a terminal pin having a knob 248 with a smaller shank 250, a single bore 252 and cord tie opening 254. The pair of tube members at right angles to these and parallel to each other, tubes 236 and 238, carry type A hubs (FIGS. 14A and 14B), the bores of which accommodate the terminal pins of the type C hubs, with locking knobs 248. The openings or bores as at 252 in hubs C correspondingly accommodate the terminal pins of the X-braced struts which lock in the manner illustrated in conjunction with FIGS. 16A and 16B. Upon assembly, the strut braces, of course, are locked into the bores in the hub C and so to the ends of the corresponding tubes 238, 242 and 238*a* and 242*a*. Consequently, the struts push the quadrilateral end structures apart to tension any banners mounted therebetween and, at the same time, force the knobs 248 of the hubs C off center in the corresponding hubs A, thereby concurrently completing the self-locking of the assembly.

Figure 19:
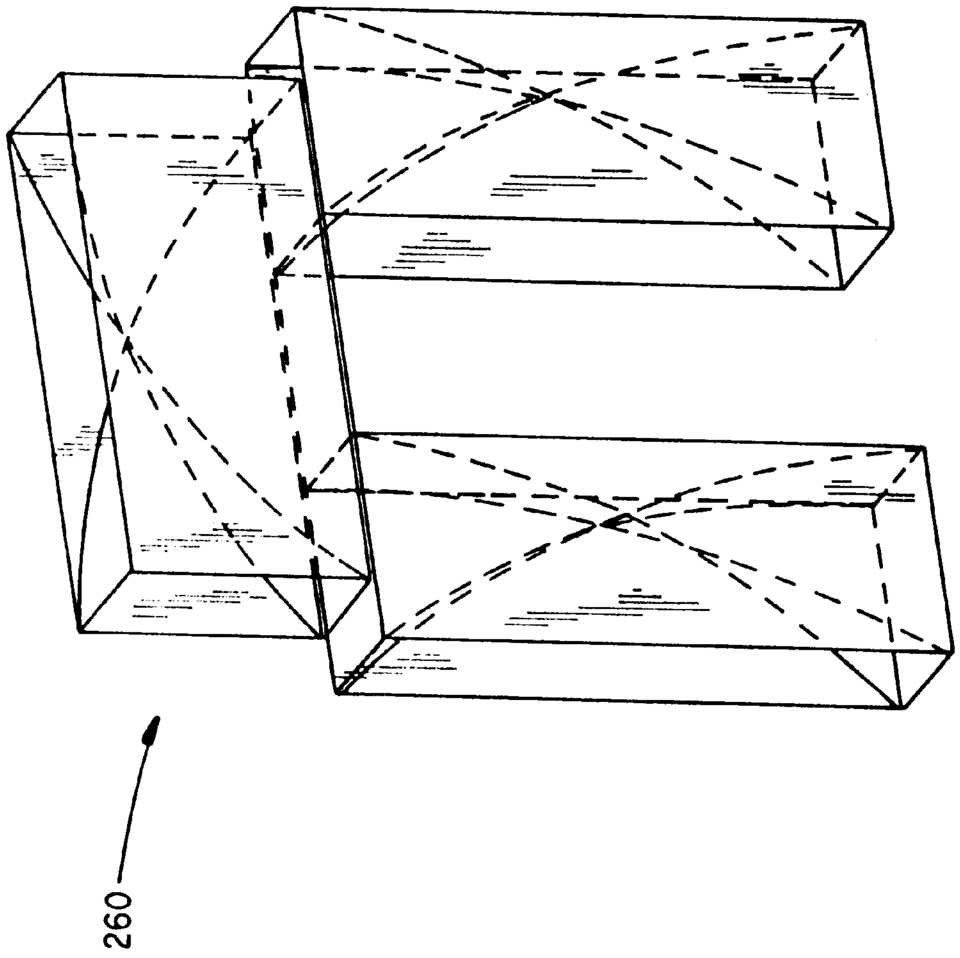
FIG. 19 shows a combination of vertical or tower rectangular banner display arrangements with a horizontal display in an arch or bridge arrangement.
Figure 20:
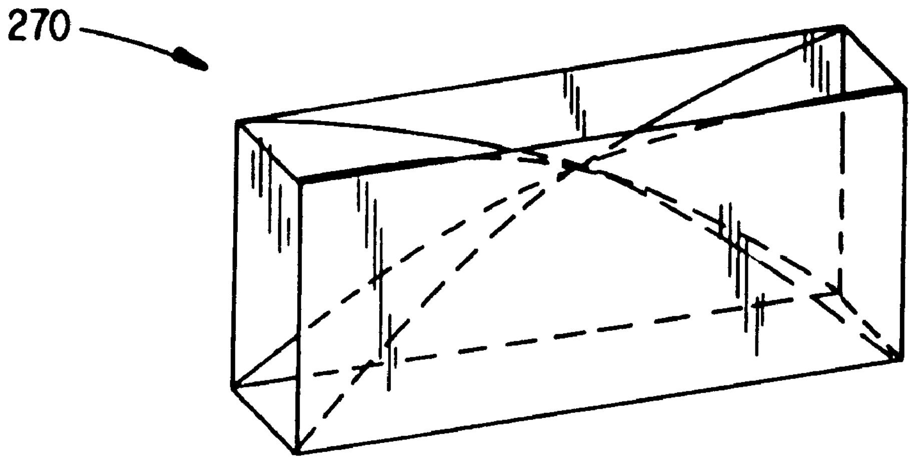
FIGS. 20 and 21 illustrate two horizontal rectangular banner display deployments.
Figure 21:
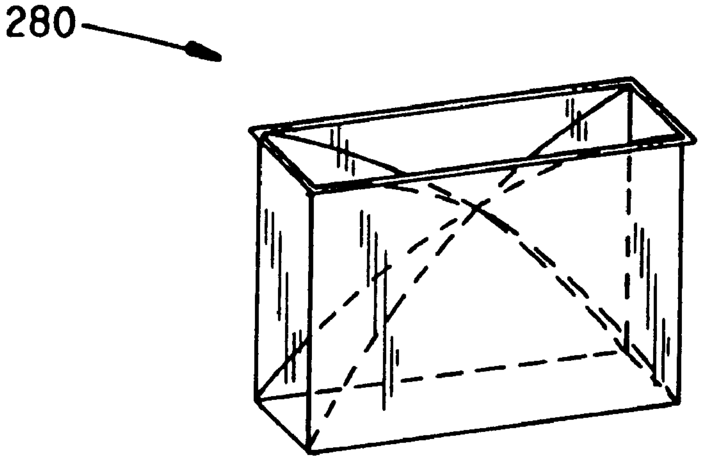

These rectangular or "box-kite" banner display embodiments are light, but very stable, as locked into place and, as shown in FIGS. 19, 20 and 21, can be arranged as arch or bridge structures as at 260 and for uses as horizontal configurations as at 270 and 280.

Figure 18:
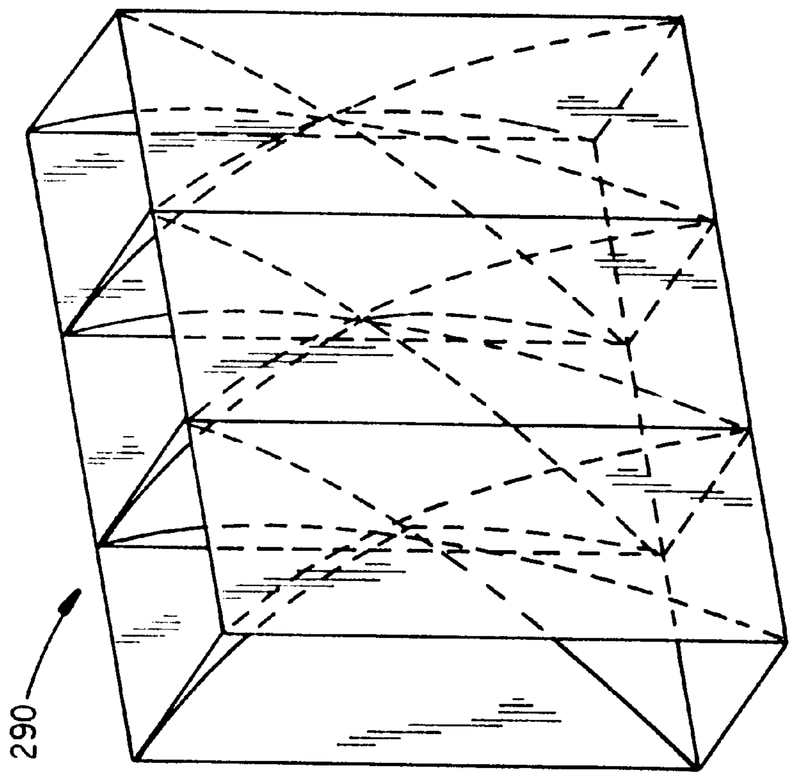
FIG. 18 illustrates a consecutive rectangular banner display arrangement.

The qualdralateral or box-kite display systems also readily lend themselves to being joined in multi-unit consecutive arrangements as illustrated in FIG. 18 at 290. In that arrangement, as in the consecutive triangular base arrangements of FIGS. 13B and 13C, joined or can be accomplished by simply replacing the type A hubs with type B hubs (FIGS. 15A and 15B) in the intermediate units which will serve to self lock the units together upon assembly.

Figure 23:
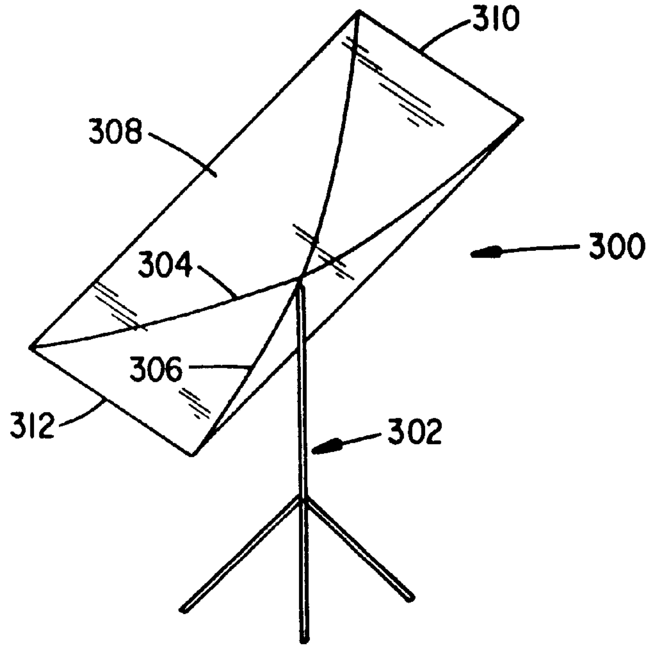
FIG. 23 depicts a "baseless" X-braced banner display arrangement used as a tripod mount.
Figure 24:
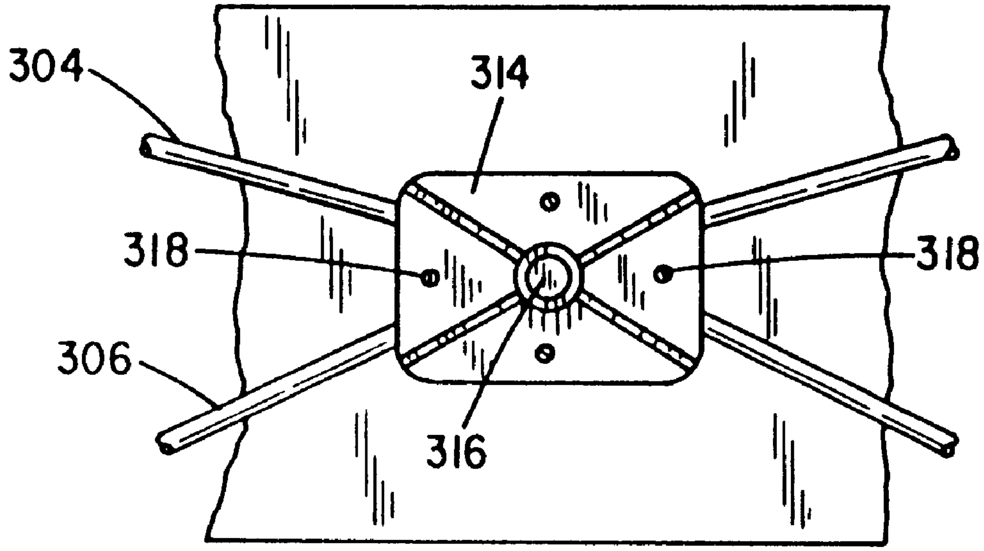
FIG. 24 is an enlarged drawing of a clamp usable to attach the banner display of FIG. 23 to a conventional tripod.

Another embodiment of an X-braced banner display in accordance with the invention is the subject of FIGS. 23 and 24 in which an X-braced mounted banner, generally 300, is mounted on a conventional tripod, generally 302. That embodiment includes X-braced strut members 304 and 306 tensioning a banner 308 between mounting rods located beneath 310 and 312. The tripod 302 is provided with a mounting clamp, one side of which is shown at 314 in the enlarged detail of FIG. 24, which attaches to the tripod 302 in a well-known fashion by means of a threaded connection at 316. The clamp with its opposite side, not shown, is fixed to the intersection of the X-brace members 304 and 306 as by using a plurality of threaded fasteners at 318 to fix the clamp members together over the X-brace. This arrangement can be used to support and carry a photo background of any color or reflectivity, in a highly maneuverable manner as for photographic background or accent in studio work. In addition, the system may be animated by connection to a mechanized means, if desired.

The hubs illustrated at A, B and C, like those previously described, may be fabricated from lightweight aluminum alloy, polymeric materials or other suitable metals. The connected unit multi-banner systems and the single unit rectangular systems may also be tethered or otherwise anchored for outdoor use. The X-bracing construction and banner support assembly and disassembly of those embodiments of FIGS. 13A–13C, 17A–20 and 23 is as described in relation to the embodiments of FIGS. 1–7. The multiple embodiments described serve to illustrate the adaptability and versatility of the banner display system of the invention.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A readily assembled knock-down, self-supporting modular display stand for displaying a plurality of flexible display devices including banners comprising:

(a) a plurality of display stand modules, each said display module further comprising:

(1) a pair of hollow mounting tubes including upper and lower mounting tubes for carrying opposite ends of a display banner and having an internal diameter;

(2) a pair of elongate resiliently flexible hollow strut members for connecting to and spacing said pair of hollow mounting tubes while in a flexed state thereby maintaining a banner carried therebetween in tension, said strut members being designed to cross behind said banner forming a bowed X pattern;

(3) a triangular stand base comprising said lower mounting tube and a pair of hollow base tube members, each having a first end designed to be connected to one end of said lower mounting tube and having a second end;

(4) elongate, adjustable, hollow stabilizing tube means having an upper end connected near the crossing point of the strut members and a lower end connected to the second end of said base tube members;

(5) strap means extending about the junction of said pair of strut members and connected with the upper end of said stabilizing tube means; and (b) means for connecting said plurality of display stand modules in resiliently retained locked consecutive aligned arrangements.

2. The display stand of claim 1 wherein said base tube members, adjustable stabilizing tube means and strap means are connected by a resilient internal cord means.

3. The display stand of claim 2 wherein said resilient internal cord means is looped over said strap means, the strands of the loop being internally threaded through said adjustable stabilizing tube means and each extending through one of said base tube members to a retaining means at the fixed end thereof.

4. The display stand of claim 3 wherein said retaining means is an eyelet having a diameter that is larger than the inside diameter of the corresponding hollow tube base members.

5. The modular display stand of claim 1 wherein said means for connecting said display stand modules in locked consecutive aligned arrangements includes resiliently retained upper and lower common stepped-down slip fit hub members received in consecutive upper and lower mounting tubes and having openings for receiving ends of strut members from consecutive display stands, and resilient chord means for holding said hub members in said consecutive upper and lower mounting tubes.

6. The display stand of claim 5 wherein said openings in said hub members are elongated to accept the end fittings of said strut members over a range of insertion angles.

7. The modular display stand of claim 5 wherein said strut members further include terminal pin end fittings having knobs and reduced diameter shanks and said openings in said common hub members include multi-diameter bores such that once inserted said knobs, off-center, in relation to said bores lock said pins in said bores.

8. The display stand of claim 1 wherein said strut members comprise a plurality of slip fitting segments and further comprising terminal pin end fittings at the extreme of said segmented struts said terminal pins being connected by a resilient cord running through the several segments sequentially capturing them therebetween.

9. The display stand of claim 8 wherein said strut members are aluminum tubing sections.

10. The display stand of claim 1 further comprising hold down means to increase the stability thereof.

11. The display stand of claim 10 wherein said hold down means comprises a staking system.

12. The display stand of claim 10 wherein said hold down means comprises one or more weighted bladder means.

13. A readily assembled knock-down, self-supporting display stand arrangemet for displaying flexible display devices including banners each stand comprising:

(a) resiliently retained opposed pairs of hollow mounting tubes forming quadrilateral mounting tube structures comprising upper and lower quadrilateral mounting tube structures for carrying opposite ends of display banners, each tube having an internal diameter;

(b) back-to-back pairs of elongate resiliently flexible hollow strut members for connecting between correspondingly parallel opposed hollow tubular mounting tubes in each quadrilateral structure while in a flexed state thereby maintaining two or more banners carried therebetween in tension, each of said pairs of strut members being of a length in relation to the length of said banners such that when said strut members are connected between said tubular mounting tubes crossing behind said banners, each of said pairs of strut members forms a bowed X pattern;

c) integral locking means for locking said structure together; and d) connecting means for a connecting plurality of the display stands in locked consecutive aligned arrangements including resiliently retained upper and lower common stepped-down slip fit hub members received in consecutive upper and lower mounting tubes and having openings for receiving ends of strut members from consecutive display stands, and resilient chord means for holding said hub members in said consecutive upper and lower mounting tubes.

14. The display stand of claim 13 wherein said locking means includes an eccentric shank and knob arrangement that cooperates with a multi-diameter hub bore system.

15. The display stand of claim 13, as configured for carrying banners back-to-back.

16. The display stand of claim 13 wherein said strut members further include terminal pin end fittings having knobs and reduced diameter shanks and said openings in said common hub members include multi-diameter bores such that once inserted said knobs, off-center, in relation to said bores lock said pins in said bores.

17. The display stand of claim 13 wherein said X patterns cross at a common point and, further comprising strap means for gathering said X patterns together at said crossing point.

18. A readily assembled knock-down display arrangement for displaying flexible display devices including banners comprising:

(a) a pair of hollow mounting tubes comprising upper and lower mounting tubes for carrying opposite ends of a display banner when vertically disposed and having an internal diameter; wherein each of said hollow mounting tubes further comprises:

(1) a pair of slip fit end hubs having hub shank sections of reduced diameter with outer hub sections of a larger diameter than said hub shank sections such that the hub shank sections are received in the end of said hollow mounting tubes and said outer hubs protrude from the ends thereof;

(2) said outer hub sections further containing recesses to receive end fittings associated with ends of said flexible hollow strut members; and (3) resilient means connecting said hub shank sections internally of each said mounting rod and holding same in place in resilient slip fit relation.

(b) a pair of elongate flexible hollow strut members for connecting to and spacing said pair of hollow tubular mounting rods while in a flexed state thereby maintaining a banner carried therebetween in tension, said strut members crossing behind said banner forming a bowed X pattern;

(c) a tripod stand base designed to be connected to the intersection of said bowed X pattern in a freely adjustable manner allowing angular adjustment in any direction.

19. The display stand of claim 18 wherein said strut members comprise a plurality of slip fitting segments and further comprising terminal pin end fittings at the extreme of said segmented struts said terminal pins being connected by a resilient cord running through the several segments sequentially capturing them therebetween.

20. The modular display stand of claim 18 wherein said strut members further include terminal pin end fittings having knobs and reduced diameter shanks and said openings in said common hub members include multi-diameter bores such that once inserted said knobs, off-center, in relation to said bore lock said pins in said bores.

* * * * *